Aug. 7, 1956  H. G. COPELAND  2,757,691
EXPANSIBLE FERRULE FOR METAL TUBING
Filed July 23, 1952

INVENTOR
Henry G. Copeland
BY
ATTORNEYS

United States Patent Office 2,757,691
Patented Aug. 7, 1956

2,757,691

EXPANSIBLE FERRULE FOR METAL TUBING

Henry G. Copeland, Watertown, Conn., assignor to The American Brass Company, a corporation of Connecticut Application July 23, 1952, Serial No. 300,486

1 Claim. (Cl. 138—58)

This invention is directed to the provision of an improved expansible ferrule suitable for securing reinforcing braid to the end of a length of flexible corrugated metal tubing coincidentally with attaching a terminal fitting to such tubing by a brazing or welding operation.

One type of flexible metal tubing is made by deeply corrugating, either annularly or helically, a thin wall seamless metallic tubing, or by otherwise producing a similar deeply corrugated tubing. When such tubing is subjected to high internal pressures, a force is exerted which tends to stretch the tubing by opening the corrugations. It is therefore common practice to enclose such tubing in a reinforcing braid of metallic wires which prevents such stretching from occurring. For the braid to perform its function properly, it must be securely attached to the tubing at each end thereof. When the tubing is provided with fittings of the type which are soldered or brazed to its ends, a ferrule in the form of a cylindrical sleeve is applied over the braid at the end of the tubing, to hold the braid against the tubing, and the braid wires and the ferrule are brazed to the tubing at the same time that the fitting is brazed thereto, so that all these components are integrally joined together at the end of the tubing.

Flexible corrugated metal tubing is made in a number of sizes to standard inside dimensions. Its outside diameter, however, is not standardized and is not generally held to close tolerances, with the result that the actual outside diameter of specimens of tubing from different manufacturers, though all nominally of the same size, will vary markedly, and even different specimens from the same manufacturer may be found to have substantial variations in outside diameter.

Heretofore, in the attachment of brazed fittings and ferrules to braid-covered flexible corrugated metal tubing, it has been common practice to employ seamless rings, having substantially the same inside diameter as the outside diameter of the tubing, as the ferrule. While such rings are eminently suited for ferrule purposes, and make particularly neat tube-and-fitting assemblies, they can be used only on lengths of tubing having very nearly the same outside diameter as the inside diameter of the ring. It is consequently quite impossible to use a single size of ferrule ring for any given size of tubing, especially when such tubing may be supplied by a number of different manufacturers. Rather, when fittings are attached by the purchaser of the tubing, it is necessary for the purchaser to have a wide range of sizes of ferrules, differing in inside diameter from one another by only very small amounts, in order to be adequately prepared for attaching fittings to even one standard size of tubing. The results of this circumstance have been twofold, both being of disadvantage to the tubing user: First, it has discouraged many tubing users from themselves attaching fittings to tubing, and has caused them instead to purchase the tubing already cut to length and with fittings attached by the manufacturer. Such tubing users lose the advantages of being able to buy the tubing itself in long lengths, and of being able to make up fitted lengths of tubing to meet individual length requirements as they arise. Second, where the tubing user does attach his own fittings, he has heretofore been discouraged from purchasing his tubing from any but a single manufacturer, because of the fact that tubing from different manufacturers, though nominally of the same size, is invariably enough different in outside diameter so as to require a different range of sizes of seamless ferrules than are used on the tubing supplied by the other manufacturers. Such tubing users have found it preferable to forego the competitive and other advantages of purchasing from several sources of supply, rather than maintain an excessive inventory of carefully separated ferrule rings.

Even when the fitting is attached by the manufacturer, added costs are involved in using the conventional seamless ferrule in all cases where the flexible tubing must be covered by a braid of non-standard wire size, or when two or more braids are applied. In both these instances the outside diameter of the tubing over which the ferrule must fit are enough different from standard so that the standard size of ferrule for the particular tubing size involved cannot be used. Also, manufacturers are sometimes called upon to produce small quantities of tubing of a size which is non-standard, and in such cases a special size of seamless tubing heretofore has had to be used to make the ferrules, even though the size differences between the special tubing and a standard one might be quite small.

The present invention provides for overcoming both of the foregoing disadvantages, by making available an expansible ferrule of very simple design which has been found in practice to be excellently suited for use on braid-covered corrugated metal tubing over a substantial range of tubing outside diameters. The new ferrule comprises a strip of metal formed into a cylinder with the ends of the strip overlapping through an angular distance of from 90° to 270°. Such cylinder may be expanded to surround a tubing of larger outside diameter than its own initial inside diameter by decreasing the extent of such overlap. That end of the strip which is positioned at the interior of the cylinder is mitered at a substantial angle (say from 30° to 60°) to the side edges of the strip, and is also beveled substantially to form a marked obtuse angle with that surface of the strip which defines the inside surface of the cylinder. This mitered and beveled configuration of the end of the strip at the interior of the cylinder enables the cylinder to be readily expanded and simultaneously forced over the end portion of a length of tubing of somewhat greater outside diameter than the initial inside diameter of the cylinder.

The invention is described in somewhat greater detail below with reference to the accompanying drawings, in which Fig. 1 shows the new ferrule applied to the end of a length of flexible corrugated metal hose;

Figure 3:
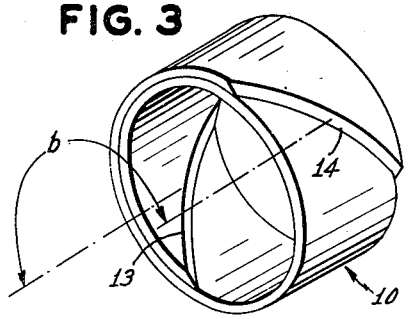
Fig. 3 is a perspective of the new ferrule in its initial unexpanded form.
Figure 4:
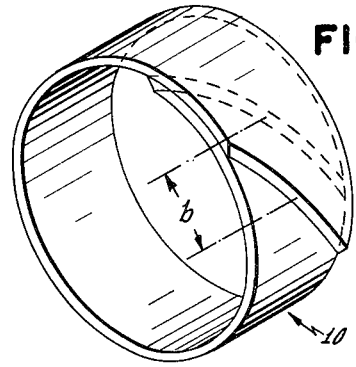
Fig. 4 is a view showing the ferrule of Fig. 3 expanded to a substantially larger diameter.
Figure 5:
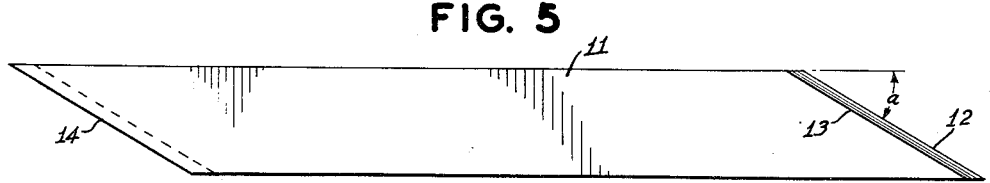
Fig. 5 is a plan of the metal strip of which the ferrule of Figs. 3 and 4 is formed.

Referring first to Figs. 3 to 5, the ferrule 10 of this invention comprises a strip of metal 11 formed into a cylinder with the ends of the strip overlapping. The strip 11, prior to forming it into a cylinder, preferably is cut to the configuration shown in Fig. 5. The strip is of a width equal to the desired width of the completed ferrule, and of a length from one and one-quarter to one and three-quarter times the circumference of the ferrule into which it is formed. At least one end 12 of the strip (the end which is to lie adjacent the interior surface of the formed cylindrical ferrule) is mitered at a substantial angle $a$ to the side edges of the strip. The angle of mitering preferably is in the range from 30° to 60° (an angle of about 30° being shown in Fig. 5). The strip also is beveled adjacent the mitered end 12 so as to form a marked obtuse angle (120° or more) along the line 13 where the beveled end portion intersects the normal flat surface of the strip 11. The opposite end 14 of the strip is with advantage similarly mitered and beveled, but such is not necessary.

The strip as above described is formed into the ferrule shown in Fig. 3 by bending it into the form of a cylinder, with the mitered and beveled ends overlapping through an angular distance $b$ of from 90° to 270°. An overlap angle $b$ of about 180° is generally very satisfactory. An angle $b$ less than 90° is undesirable because the extent to which the ferrule can be expanded is then undesirably limited; and an angle $b$ greater than 270° is undesirable because resistance of the ferrule to expansion is thereby undesirably increased. The mitered and beveled end 12 of the strip is positioned at the interior of the cylindrical ferrule. Also, that surface of the strip which makes an obtuse angle with the beveled end portion along the line 13 is the surface of the strip which defines the interior surface of the cylindrical ferrule.

The above-described construction is readily apparent from the drawings. It is also apparent that the ferrule as originally formed (Fig. 3) can be readily expanded to a substantially larger diameter by simply reducing the angular distance $b$ through which the ends of the strip overlap. Such expansion of the ferrule is indicated in Fig. 4.

The ferrule as initially made has an inside diameter no greater, and preferably slightly less, than the outside diameter of the smallest diameter tubing in connection with which it is intended to be used. It can then very readily be expanded and simultaneously forced over the end portion of a length of tubing of somewhat greater outside diameter than its own inside diameter, by pressing it against the end of the tubing and turning it in a direction such as to cause the angular distance of overlap $b$ to diminish. Once the ferrule has thus been expanded and pressed over the end of a length of braid-covered tubing, the natural resiliency of the metal of the ferrule causes it to hug the tubing rather tightly and to hold the braid against the end of the tubing preparatory to attaching a fitting by a brazing operation.

Figure 1:
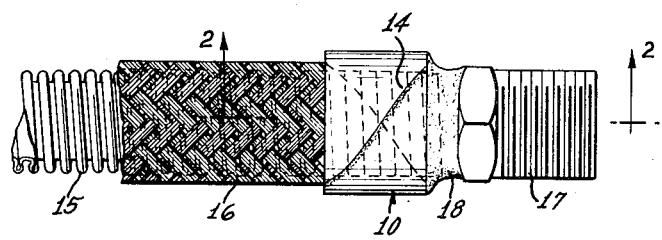
Figure 2:
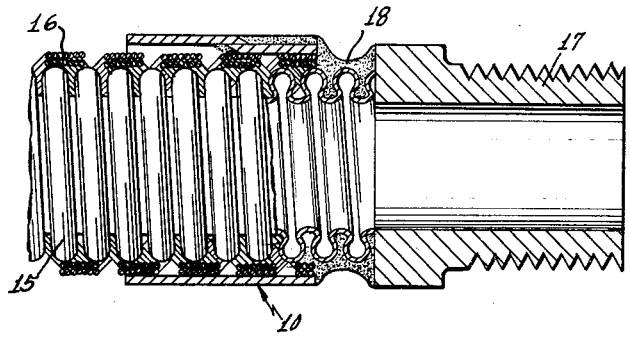
Fig. 2 is a cross section taken substantially along the line 2—2 of Fig. 1.

Figs. 1 and 2 show a length of corrugated flexible metal tubing 15 covered by a braid 16 which has been assembled with the above-described ferrule 10 and has had a fitting 17 attached by brazing, soldering or welding. The filler metal 18 applied in the course of the soldering, brazing or welding operation not only serves to join the fitting 17 permanently to the tubing 15, but also to bond the wires of the braid 16 and the ferrule 10 to the end of the tubing 15. Some of the filler metal is advantageously deposited along the exposed end 14 of the strip from which the ferrule 10 is formed, and is allowed to flow between the overlapping end portions of such strip, in order to bond the overlapping ends tightly together.

I claim:

The combination with a corrugated flexible metal tube covered by a reinforcing wire braid and having a fitting soldered to an end thereof, of a ferrule clamping the reinforcing braid to the end portion of the tube adjacent said fitting and soldered to said end portion and said fitting, said ferrule comprising a strip of metal formed into a cylinder with the ends of said strip overlapping through an angular distance of from 90° to 270°, said cylinder being initially of slightly smaller diameter than the braid-covered tubing, whereby said cylinder fits snugly about the braid and tends to clamp it against the tubing, at least that end of the strip which is positioned at the interior of the cylinder being mitered at a substantial angle to the side edges of the strip and being also beveled substantially to form a marked obtuse angle with that surface of the strip which defines the inside surface of the cylinder, whereby expansion of the fitting and forcing it over the end portion of the braid and tubing is facilitated.

References Cited in the file of this patent

UNITED STATES PATENTS

| 293,831 | Wickers | Feb. 19, 1884 |
| 480,515 | Redfield | Aug. 9, 1892 |
| 589,216 | McKee | Aug. 31, 1897 |
| 1,708,326 | Rastall | Apr. 9, 1929 |

FOREIGN PATENTS

| 20,007 | Great Britain | Aug. 31, 1897 |